(12) United States Patent
Gim et al.

(10) Patent No.: US 9,381,945 B2
(45) Date of Patent: Jul. 5, 2016

(54) STRUCTURE AND METHOD FOR COUPLING SIDE STRUCTURES AND ROOF RAILS

(71) Applicant: Hyundai Motor Company, Seoul (KR)

(72) Inventors: Seok-Ju Gim, Yongin-si (KR); Young-Ho Lee, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/135,243

(22) Filed: Dec. 19, 2013

(65) Prior Publication Data
US 2014/0312656 A1 Oct. 23, 2014

(30) Foreign Application Priority Data

Apr. 19, 2013 (KR) .......................... 10-2013-0043242

(51) Int. Cl.
B62D 25/06 (2006.01)
B62D 25/04 (2006.01)

(52) U.S. Cl.
CPC ................ B62D 25/06 (2013.01); B62D 25/04 (2013.01); Y10T 29/49826 (2015.01)

(58) Field of Classification Search
CPC ...... B62D 25/06; B62D 25/04; B62D 27/023; Y10T 29/49826
USPC ............ 296/193.05, 203.03, 203.01, 205, 29, 296/187.12, 210
See application file for complete search history.

(56) References Cited

U.S. PATENT DOCUMENTS

| 6,824,204 B2* | 11/2004 | Gabbianelli et al. .......... 296/205 |
| 7,213,874 B2* | 5/2007 | Osterberg et al. ............. 296/210 |
| 2001/0003400 A1 | 6/2001 | Grimm et al. |

FOREIGN PATENT DOCUMENTS

| JP | 9-175429 A | 7/1997 |
| JP | 2002-211442 A | 7/2002 |
| KR | 2005-0069281 A | 7/2005 |

* cited by examiner

Primary Examiner — Joseph D Pape
Assistant Examiner — Dana Ivey
(74) Attorney, Agent, or Firm — McDermott Will & Emery LLP

(57) ABSTRACT

A structure for coupling roof rails using a side two-buck structure includes a floor formed of a bottom of a vehicle body, side inner panels coupled to both side surfaces of the floor, and roof rails coupled to upper portions of the side inner panels. A method for coupling roof rails includes coupling side inner arms to side surfaces of a vehicle floor, coupling a cross shaped joint part to an upper portion of the side inner arm, coupling a side inner reinforcement part to outer surfaces of the side inner arm and the joint part, coupling the roof rail to an upper portion of the side inner reinforcement part and an upper surface of the joint part, coupling a side outer reinforcement panel to an outer portion of the side inner reinforcement part, and coupling a side outer panel to an outer portion of the side outer reinforcement panel.

4 Claims, 7 Drawing Sheets

STRUCTURE AND METHOD FOR COUPLING SIDE STRUCTURES AND ROOF RAILS

CROSS-REFERENCE TO RELATED APPLICATIONS

This application claims priority under 35 U.S.C. §119 to and the benefit of Korean Patent Application No. 10-2013-0043242, filed on Apr. 19, 2013, in the Korean Intellectual Property Office, the disclosure of which is incorporated herein by reference in its entirety.

TECHNICAL FIELD

The present disclosure relates to a structure and a method for coupling roof rails, and more particularly, to a structure and a method for coupling roof rails to a side inner panel of a vehicle body using a structure for coupling a side structure.

BACKGROUND

In general, a vehicle includes a vehicle body and a chassis. The vehicle body forms the external appearance of the vehicle, and the chassis is a part in which mechanical devices are installed.

As a constituent element of the vehicle body, side structures such as a side inner panel, a side outer reinforcement panel, not only maintain the external appearance of a lateral side of the vehicle body, but also protect passengers from external impact by increasing rigidity of the lateral side of the vehicle body.

In recent years, as interests in safety for passengers with more restrictions become higher, research has been actively conducted to improve safety for passengers by reinforcing a lateral side portion of the vehicle body, which is more vulnerable to an external impact than a front side or a rear side of the vehicle body during a car accident.

Referring to FIG. 1, a method of assembling the vehicle body in the related art at the time of a side sub assembly includes a side inner panel (not illustrated), a side outer reinforcement panel 2 coupled to an outer portion of the side inner panel, a side outer inner panel 3, and a side outer panel 4 assembled in advance in a main buck process, and then assembled with a floor 1 and roof rails 5, and a roof panel 6 on an upper portion of the vehicle body.

However, as illustrated in FIGS. 1 to 3, when the side structures and the roof rails 5 are coupled to each other by using the method in the related art, connecting portions between the side structures and the roof rails are formed in a simple flange joint without having a cross section, and thereby a side inner reinforcement part 7 is disconnected from the roof rails 5 without being connected to the roof rails 5.

The lateral side portion of the vehicle therefore is excessively deformed at the time of collision and rigidity test, and thereby safety for the passengers may not be secured.

Referring to FIG. 2A, an extension panel 9 having welding holes 8 is coupled to the connection portions between the side structures and the roof rails 5 in order to solve the aforementioned structural problem and improve performance.

However, the size of a component becomes large and the weight of the vehicle is increased as the extension panel 9 is added to the connection portions between the side structures and the roof rails, and welding performance deteriorates because of the addition of the welding holes.

SUMMARY

The present disclosure has been made in an effort to provide a structure and a method for coupling side structures and roof rails, which improve rigidity of a lateral side portion of a vehicle body by using a so-called side two-buck structure among side structures in which at the time of assembling the vehicle body of a vehicle in a main buck process, the side inner panel and the roof rails are first coupled to each other, and then a side outer reinforcement panel and a side outer panel are coupled to an outer portion of the side inner panel.

A structure for coupling side structures and roof rails includes: a floor which forms a bottom of a vehicle body; side inner panels coupled to both side surfaces of the floor in an upward direction of the vehicle body; and roof rails coupled to upper portions of the side inner panels in a width direction of a vehicle, in which both ends of the roof rails are coupled to and overlapped with outer surfaces of the upper portions of the side inner panels, respectively.

The side inner panel may include: a side inner arm having a central portion formed in a concave-convex shape protruding in a longitudinal direction; a joint part formed in a cross shape so as to be coupled to an upper portion of the side inner arm, and having a lower surface coupled to an upper end of the side inner arm and formed in a concave-convex shape protruding to have a shape identical to a cross section of the side inner arm, and an upper surface coupled to the ends of the roof rails and formed in a concave-convex shape protruding to have a shape identical to cross sections of the roof rails. A side inner reinforcement part is coupled to and overlapped with outer surfaces of the side inner arm and the joint part and formed in a concave-convex shape protruding to have a shape identical to cross sections of the side inner arm and the joint part.

Both ends of the roof rail may be curved in a lower direction of the vehicle body and formed in a concave-convex shape protruding to have a shape identical to cross sections of upper surfaces of the side inner reinforcement part and the joint part.

A method for coupling side structures and roof rails includes: coupling side inner arms having a central portion formed in a concave-convex shape protruding in a longitudinal direction to both side surfaces of a floor which forms a bottom of a vehicle body, respectively; coupling a cross shaped joint part having a lower surface coupled to an upper end of the side inner arm and formed in a concave-convex shape protruding to have a shape identical to a cross section of the side inner arm, and an upper surface coupled to an end of a roof rail and formed in a concave-convex shape protruding to have a shape identical to a cross section of the roof rail to an upper portion of the side inner arm; coupling a side inner reinforcement part formed in a concave-convex shape protruding to have a shape identical to cross sections of the side inner arm and the joint part to outer surfaces of the side inner arm and the joint part to be overlapped with each other; coupling the roof rail formed in a concave-convex shape protruding to have a shape identical to cross sections of the upper surfaces of the side inner reinforcement part and the joint part to an upper portion of the side inner reinforcement part and an upper surface of the joint part in a width direction of the vehicle; coupling a side outer reinforcement panel to an outer portion of the side inner reinforcement part; and coupling a side outer panel to an outer portion of the side outer reinforcement panel.

In the coupling of the roof rail to the upper portion of the side inner reinforcement part and the upper surface of the joint part in the width direction of the vehicle, the side inner reinforcement part, the joint part, and the roof rail may be coupled to each other by using a spot welding method.

When the side structures and the roof rails are coupled to each other, an upper portion of the side inner reinforcement part and both ends of the roof rails are directly coupled to each other so as to be overlapped with each other, thereby maintaining continuity of the cross sections between the side inner reinforcement part and the roof rail.

Accordingly, efficiency of transferring the load of the vehicle body is improved, and rigidity of the lateral side portion of the vehicle body and collision performance of the vehicle are greatly improved.

Since a separate extension panel or the like is not necessary at the time of coupling the side structures and the roof rails, as weight of the vehicle is decreased, fuel efficiency of the vehicle is increased, production costs are reduced, and manufacturing is simplified.

As the cross shaped joint part is formed on an upper portion of the side inner arm, a connection portion of the side inner panel and the roof side inner panel may be removed, so that super high tensile steel plates or the like may be used as main members of the side inner panel and the roof side inner panel. Thus improves fuel efficiency of the vehicle by reducing weight of the vehicle body.

The cross section of the roof rail has continuity with the cross section of the side inner panel, and a joint portion may be spot welded without using a welding hole method or carbon dioxide ($CO_2$) welding. Accordingly, deterioration of welding performance due to addition of welding holes is improved, corrosion of the vehicle body is more resistant for a longer period of time in comparison with other welding methods, and manufacturing process is simplified.

DETAILED DESCRIPTION OF THE EMBODIMENTS

Hereinafter, the present disclosure will be described in detail on the basis of the accompanying drawings.

Figure 1:
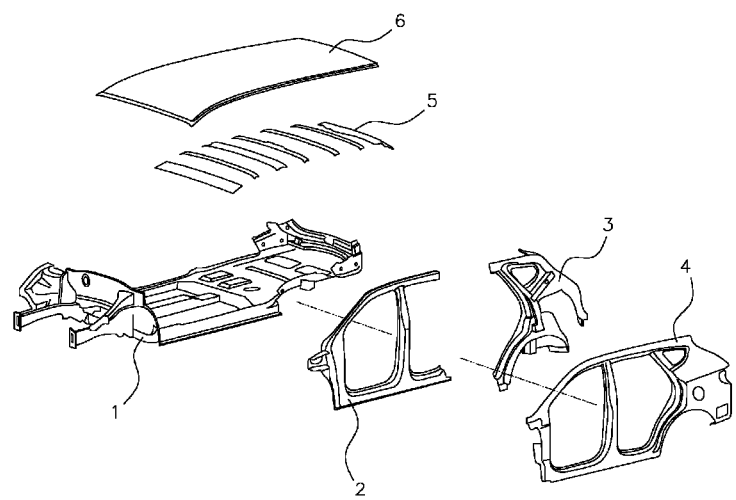
FIG. 1 is an assembly view of side structures and roof rails of the related art.
Figure 2A:
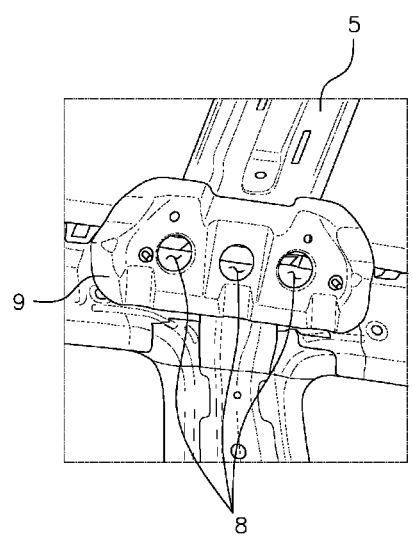
FIG. 2A is a perspective view of a structure for coupling the roof rail of the related art seen from an inner side of a vehicle body.
Figure 2B:
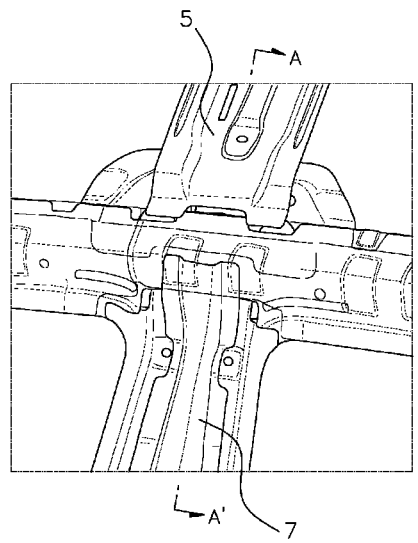
FIG. 2B is a perspective view of the structure for coupling the roof rail of the related art seen from an outer side of the vehicle body.
Figure 3:
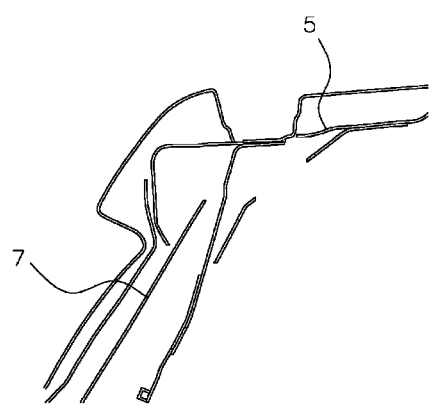
FIG. 3 is a cross-sectional view taken along line A-A' of FIG. 2B.
Figure 4:
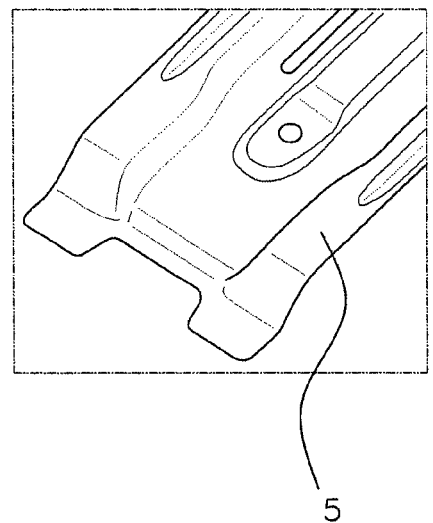
FIG. 4 is an enlarged view illustrating one end of the roof rail of the related art.

Referring to FIG. 1, a method of assembling the vehicle body in the related art at the time of a side sub assembly includes a side inner panel (not illustrated), a side outer reinforcement panel 2 coupled to an outer portion of the side inner panel, a side outer inner panel 3, and a side outer panel 4 assembled in advance in a main buck process, and then assembled with a floor 1, and roof rails 5, and a roof panel 6 assembled on an upper portion of the vehicle body.

Figure 5:
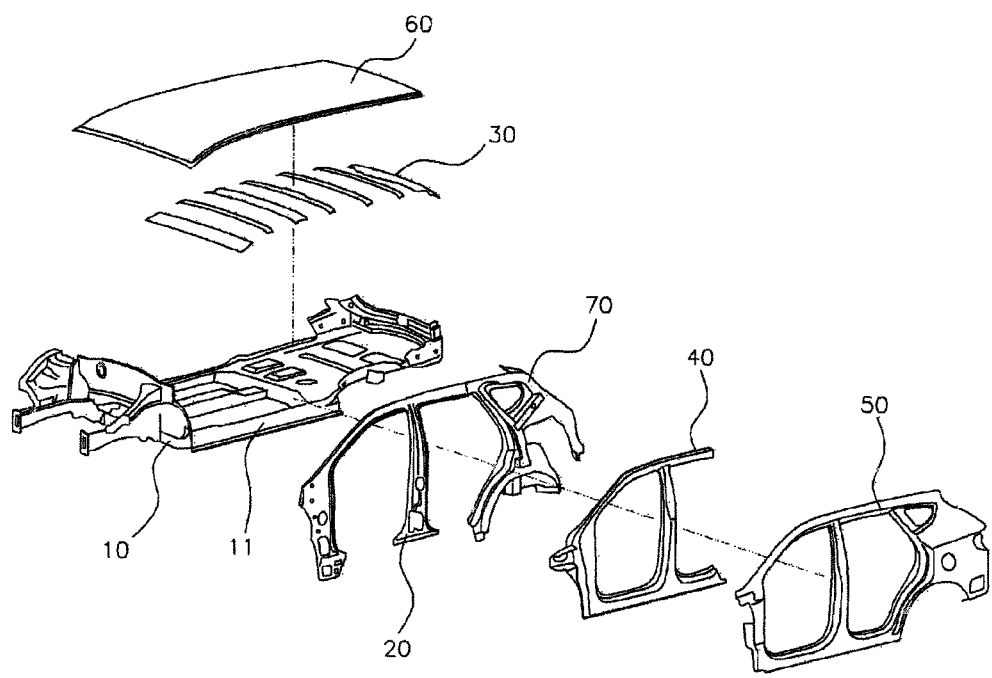
FIG. 5 is an assembly view of side structures and roof rails according to the present disclosure.

However, as illustrated in FIG. 5, the present invention is formed by a so-called side two-buck structure among side structures in which in a main buck process, after roof rails 30 are coupled to upper portions of side inner panels which are coupled at both side surfaces 11 of a floor 10 which fourms a bottom of a vehicle body, in an upward direction of the vehicle body, so that both ends of the roof rails 30 in a width direction of a vehicle are overlapped with outer surfaces of upper portions of the side inner panels 20, respectively, side outer reinforcement panels 40 are coupled to outer portions of the side inner panels 20, and side outer panels 50 are coupled to outer portions of the outer reinforcement panels.

Figure 6A:
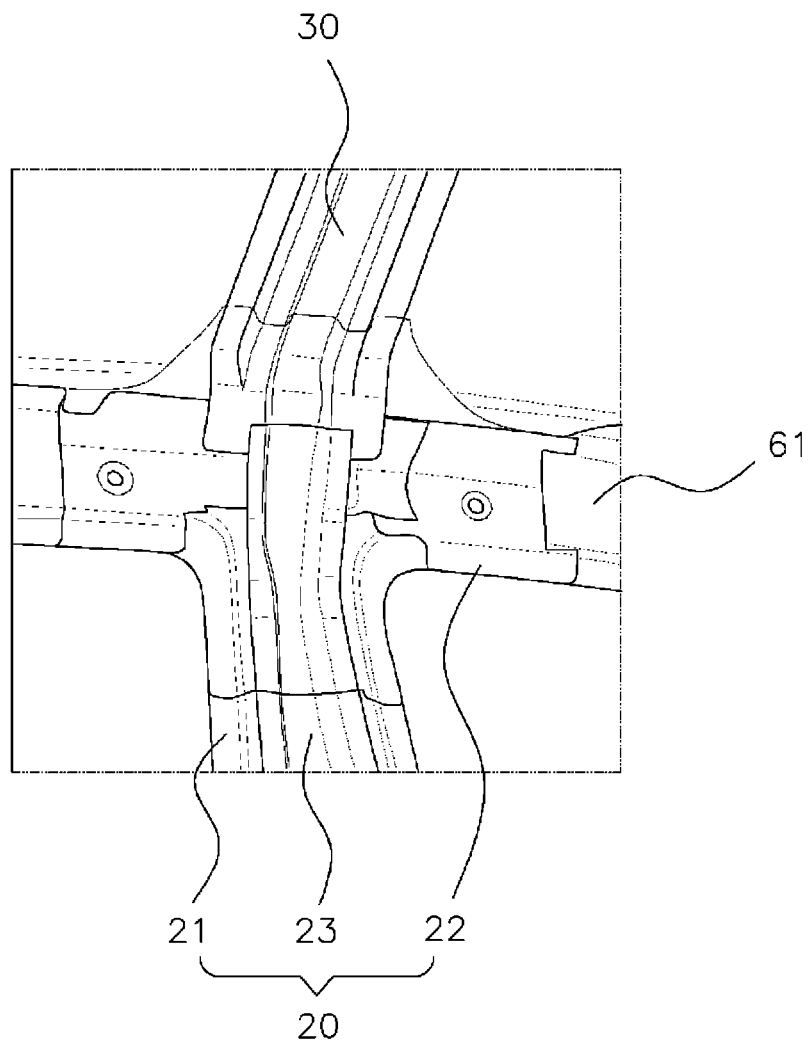
FIG. 6A is a perspective view of a structure for coupling a roof rail according to the present disclosure seen from an inner side of a vehicle body.
Figure 6B:
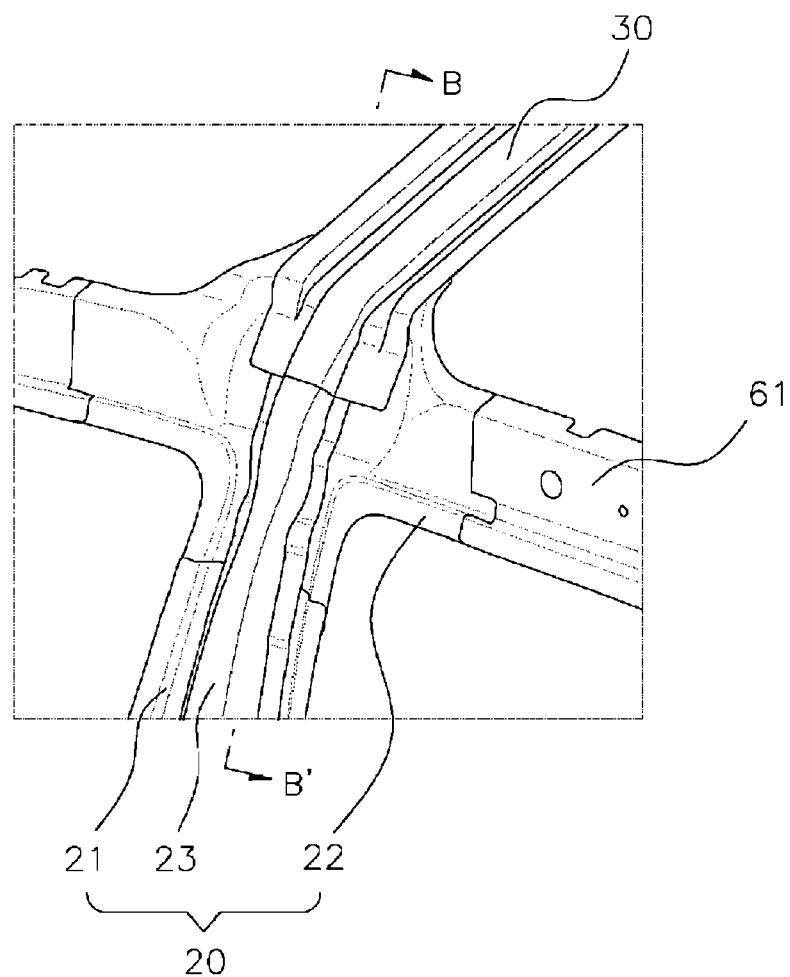
FIG. 6B is a perspective view of the structure for coupling the roof rail according to the present disclosure when seen from an outer side of the vehicle body.
Figure 7:
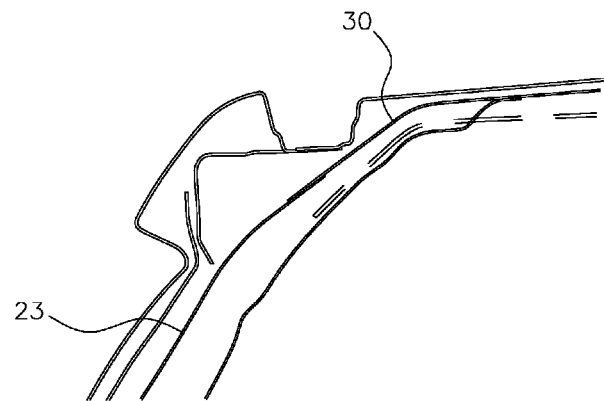
FIG. 7 is a cross-sectional view taken along line B-B' of FIG. 6B.

The upper portions of the side inner panels 20 are coupled at both side surfaces of a floor 10 which is a bottom of a vehicle body in an upward direction of the vehicle body, so that both ends of the roof rails 30 in a width direction of a vehicle are overlapped with outer surfaces of the upper portions of the side inner panels 20. Referring to FIGS. 5 to 7, in a main coupling process, the floor 10 and the side inner panels 20 are coupled to each other, the roof rails 30 are coupled to the upper portions of the side inner panels 20 in the width direction of the vehicle. The side outer reinforcement panels 40 and the side outer panels 50 are coupled to the side inner panels 20. As a result, continuity of the cross sections between side inner reinforcement parts 23 and the roof rails 30 may be maintained.

Figure 9:
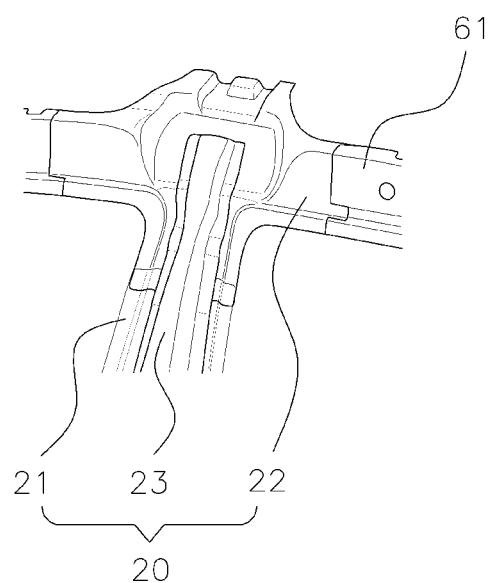
FIG. 9 is an enlarged view illustrating an upper portion of a side inner panel according to the present disclosure.

Referring to FIGS. 6 and 9, the side inner panel 20 includes a side inner arm 21 having a central portion formed in a concave-convex shape protruding in a longitudinal direction, a joint part 22 formed in a cross shape so as to be coupled to an upper portion of the side inner arm 21 and has a lower surface coupled to an upper end of the side inner arm 21 and formed in a concave-convex shape protruding identical to a cross section of the side inner arm 21, An upper surface is coupled to each of the both ends of the roof rails 30 and formed in a concave-convex shape protruding ape identical to the cross sections of the roof rails 30. The side inner reinforcement part 23 is coupled to and overlapped with outer surfaces of the side inner arm 21 and the joint part 22 and formed in a concave-convex shape protruding identical to the cross sections of the side inner arm 21 and the joint part 22.

The cross section of the side inner arm 21 has a protruding central portion and is formed in a concave-convex shape in which both sides spaced apart from the central portion at a predetermined distance are recessed and both end portions protrude.

That is, the cross section of the side inner arm 21 is formed in a convex-concave-convex-concave-convex shape in which a protruding shape and a recessed shape are repeated. When the side inner reinforcement part 23 or the like is coupled to and overlapped with the side inner arm 21, the side inner reinforcement part 23 or the like is coupled to the side inner arm 21 so as to match the protruding or recessed portion of the side inner arm 21. As a result, a coupling position of the side inner reinforcement part 23 or the like may be easily found out, rigidity of a lateral side portion of the vehicle body is increased, and distortion of the vehicle body is minimized.

The side inner arm 21 may be formed of a high tensile steel plate with tensile strength of 590 MPa to 700 MPa or a super high tensile steel plate with tensile strength of 700 MPa to 1,800 MPa, thereby maintaining a light weight and high strength.

As illustrated in FIGS. 5 and 9, a roof panel 60 is coupled to the roof rails 30 formed in the width direction of the vehicle body and roof side inner panels 61 formed in a forward and rearward direction of the vehicle body, so as to be coupled to an upper portion of the vehicle body. A cross section of the roof side inner panel 61 is formed in a shape in which one side spaced apart from a central portion of the cross section of the roof side inner panel 61 at a predetermined distance is recessed, and an end portion of the roof side inner panel 61 thereof protrudes. Therefore, the cross section of the roof side inner panel 61 is formed in a convex-concave-convex shape.

The joint part 22 is formed in a cross shape having a central portion in which holes are perforated, and a lower surface of the joint part 22 coupled to the upper end of the side inner arm 21 is formed in a concave-convex shape protruding to have a shape identical to the cross section of the side inner arm 21.

Left and right surfaces of the joint part 22, which are coupled to the roof side inner panels 61, may have a shape identical to the cross section of the roof side inner panel 61.

The upper surface coupled to the ends of the roof rails 30 is curved in the width direction of the vehicle, and a cross section of the upper surface is formed in a convex-concave-convex-concave-convex shape in which a protruding shape and a recessed shape are repeated, similar to the cross section of the side inner arm 21.

As the joint part 22 is formed, a connection portion between a side inner arm and a roof side inner panel, which was difficult to be formed when the side inner arm and the roof side inner panel are integrally configured in the related art, may be removed, and the side inner arm 21 and the roof side inner panel 61 may be formed in linear shapes with simple shapes.

Since the side inner arm 21 and the roof side inner panel 61 may be formed in simple shapes, super high tensile steel plates or the like may be used as main members of the side inner arm 21 and the roof side inner panel 61, and thereby fuel efficiency of the vehicle is improved because weight of the vehicle body is reduced.

The side inner reinforcement part 23 may be coupled to and overlapped with the outer portions of the lower surfaces of the side inner arm 21 and the joint part 22 and may have a central portion having a protruding concave-convex shape. The width of the side inner reinforcement part 23 may not be wider than that of the lower surfaces of the side inner arm 21 and the joint 22.

Figure 8:
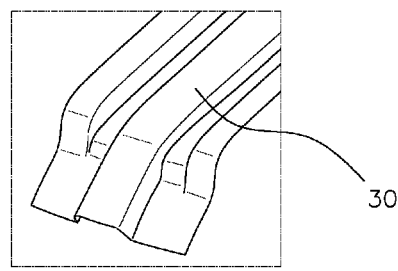
FIG. 8 is an enlarged view illustrating one end of the roof rail according to the present disclosure.

Referring to FIGS. 6 and 8, both ends of the roof rail 30 are curved in a lower direction of the vehicle body so as to be coupled to and overlapped with the side inner reinforcement part 23 and the joint part 22, and formed in a concave-convex shape protruding to have a shape identical to the cross sections of the upper surfaces of the side inner reinforcement part 23 and the joint part 22.

A cross section where the roof rail 30 is coupled to the side inner reinforcement part 23 has a central portion having a protruding concave-convex shape. The roof rail 30 is coupled to the upper surface of the joint part 22 formed in a convex-concave-convex-concave-convex shape in which a protruding shape and a recessed shape are repeated similar to the cross section of the upper surface of the joint part 22.

Unlike the related art, the end of the roof rail 30 of the present disclosure has a shape in which all of the cross sections of the side inner reinforcement part 23, the joint part 22, and the roof rail 30 coincide with each other, and portions where the side inner reinforcement part 23, the joint part 22, and the roof rail 30 are coupled to each other are formed in a shape in which surfaces are in contact with each other. Accordingly, the side inner reinforcement part 23 may be coupled to the roof rail 30 while maintaining continuity of cross sections. The roof rail 30, the joint part 22 and the side inner reinforcement part 23 form a closed cross section to be integrally extended with improved coupling force and strength of the side structures and the roof rails.

As the roof rail 30 is formed in a shape described above, efficiency of transferring a load of the vehicle body is greatly enhanced, the overall rigidity of the vehicle body is increased, and collision performance is remarkably improved.

As illustrated in FIGS. 5 and 6, the present invention is made by a method for coupling a rail roof using a side two-buck structure, including sequential steps of: coupling the side inner arms 21 having a central portion formed in a concave-convex shape protruding in a longitudinal direction to both side surfaces 11 of the floor 10 which forms a bottom of the vehicle body, respectively, in a main vehicle body process; coupling the cross shaped joint part 22 having a lower surface coupled to an upper end of the side inner arm 21 and formed in a concave-convex shape protruding to have a shape identical to a cross section of the side inner arm 21, and an upper surface coupled to an end of the roof rail 30 and formed in a concave-convex shape protruding to have a shape identical to the cross sec on of the roof rail 30 to an upper portion of the side inner arm 21; coupling the side inner reinforcement part 23 formed in a concave-convex shape protruding to have a shape identical to cross sections of the side inner arm 21 and the joint part 22 to outer surfaces of the side inner arm 21 and the joint part 22 to be overlapped with each other; coupling the roof rail 30 formed in a concave-convex shape protruding to have a shape identical to cross sections of the upper surfaces of the side inner reinforcement part 23 and the joint part 22 to an upper portion of the side inner reinforcement part 23 and an upper surface of the joint part 22 in a width direction of the vehicle; coupling the side outer reinforcement panel 40 to an outer portion of the side inner reinforcement part 23; and coupling the side outer panel 50 to an outer portion of the side outer reinforcement panel 40.

That is, as illustrated in FIGS. 5 to 7, the side inner reinforcement part 23 and the roof rail 30 are directly coupled to each other while maintaining continuity of cross sections by performing steps of: coupling the side inner arms 21 to both side surfaces 11 of the floor 10; coupling the joint part 22 to an upper portion of the side inner arm 21; coupling the side inner reinforcement part 23 to outer surfaces of the side inner arm 21 and the joint part 22 to be overlapped with each other; and coupling the roof rail 30 to an upper portion of the side inner reinforcement part 23 and an upper surface of the joint part 22 in a width direction of the vehicle.

In the coupling of the roof rail 30 to the upper portion of the side inner reinforcement part 23 and the upper surface of the joint part 22 in the width direction of the vehicle, the side inner reinforcement part 23, the joint part 22, and the roof rail 30 may be coupled to each other by spot welding.

Spot welding refers to a resistance welding method of attaching ends of electrodes on an upper surface and a lower surface of metallic plates, which are piled up, concentrating electric current and pressing pressure onto a relatively small portion, locally heating the metallic plates, and pressing the metallic plates with the electrodes. Since an end of the roof rail is formed in a notch shape, in a structure for coupling the roof rail 5 of the related art, the roof rail is coupled by applying welding hole welding or carbon dioxide ($CO_2$) welding. However, in the present disclosure, since an end of the roof rail 30 is formed in a shape overlapped with the side inner reinforcement part 23, portions where the surfaces of the side inner reinforcement part 23 and the joint part 22 and the surface of the roof rail 30 are in contact with each other may be coupled by spot welding.

When the side inner reinforcement part 23 and the joint part 22, and the roof rail 30 are coupled by spot welding, the side inner reinforcement part 23 and the joint part 22, and the roof rail 30 may be coupled with minimal heat, and accordingly, corrosion of the vehicle body is more resistant to a longer period of time in comparison with other welding methods.

The aforementioned present disclosure is not limited to the aforementioned exemplary embodiments and the accompanying drawings, and it is apparent to the person skilled in the art that various substitutions, modifications, and alterations may be possible without departing from the technical spirit of the present disclosure.

What is claimed is:

1. A structure for coupling side structures and roof rails of a vehicle having a roof and a body with a front end and a rear end, the roof rails each having two opposing ends, the structure comprising:
    a floor which forms a bottom of the body of the vehicle, the floor having two opposing side surfaces extending from the front of the body to the rear of the body;
    side inner panels coupled to the side surfaces of the floor and extending from the side surfaces of the floor toward the roof of the vehicle in an upward direction; and
    roof rails coupled to upper portions of the side inner panels in a width direction of a vehicle,
    wherein the ends of the roof rails are coupled to and overlap outer surfaces of the upper portions of the side inner panels, respectively,
    wherein each of the side inner panels includes:
    a side inner arm having a central portion formed in an alternatingly concave-convex shape protruding in a longitudinal direction;
    a joint part which is formed in a cross shape so as to be coupled to an upper portion of the side inner arm, and has a lower surface coupled to an upper end of the side inner arm and formed in the alternatingly concave-convex shape protruding to have a shape identical to a cross section of the side inner arm, and an upper surface coupled to one of the ends of the roof rails and formed in the alternatingly concave-convex shape protruding to have a shape identical to the cross sections of the roof rails; and
    a side inner reinforcement part coupled to and overlapping outer surfaces of the side inner arm and the joint part and formed in the alternatingly concave-convex shape protruding to have a shape identical to cross sections of the side inner arm and the joint part.

2. The structure of claim 1, wherein the ends of the roof rails are curved in a lower direction of the vehicle body, and formed in the alternatingly concave-convex shape protruding to have a shape identical to cross sections of upper surfaces of the side inner reinforcement part and the joint part.

3. A method for coupling a side structure and a roof rail of a vehicle having a roof and a body, the roof rail having two opposing ends, the method comprising:
    coupling a side inner arm to each of two opposing side surfaces of a floor which forms a bottom of the body of the vehicle, each side inner arm having a central portion formed in an alternatingly concave-convex shape protruding in a longitudinal direction;
    coupling a cross shaped joint part to an upper portion of each side inner arm, the joint part having a lower surface coupled to an upper end of the side inner arm and formed in the alternatingly concave-convex shape protruding to have a shape identical to a cross section of the side inner arm, and an upper surface coupled to an end of a roof rail and formed in the alternatingly concave-convex shape protruding to have a shape identical to the cross section of the roof rail;
    coupling a side inner reinforcement part to outer surfaces of the side inner arm and the joint part in an overlapping manner, the side inner reinforcement part formed in the alternatingly concave-convex shape protruding to have a shape identical to cross sections of the side inner arm and the joint part;
    coupling each of the ends of the roof rail to an upper portion of each side inner reinforcement part and an upper surface of each joint part such that the roof rail extends in a width direction of the vehicle, the roof rail formed in the alternatingly concave-convex shape protruding to have a shape identical to cross sections of the upper surfaces of the side inner reinforcement part and the joint part;
    coupling a side outer reinforcement panel to an outer portion of each side inner reinforcement part; and
    coupling a side outer panel to an outer portion of each side outer reinforcement panel.

4. The method of claim 3, wherein in the coupling of each of the ends of the roof rail to the upper portion of each side inner reinforcement part and the upper surface of each joint part, the side inner reinforcement part, the joint part, and the roof rail are coupled to each other using spot welding.

\* \* \* \* \*